United States Patent
Vincitore et al.

(10) Patent No.: US 9,745,526 B2
(45) Date of Patent: Aug. 29, 2017

(54) FUEL PROCESSING OF FEEDSTOCKS HAVING COMPONENTS HARMFUL TO HYDRODESULFURIZATION

(75) Inventors: Antonio M. Vincitore, South Windsor, CT (US); Peter F. Foley, Manchester, CT (US); Nancy P. Foley, legal representative, Plymouth, MA (US); Derek W. Hildreth, Temecula, CA (US); John L. Preston, Hebron, CT (US); Stephen G. Pixton, South Windsor, CT (US); James A. Davies, Glastonbury, CT (US)

(73) Assignee: Doosan Fuel Cell America, Inc., Atlanta, GA (US)

( * ) Notice: Subject to any disclaimer, the term of this patent is extended or adjusted under 35 U.S.C. 154(b) by 15 days.

(21) Appl. No.: 13/416,744

(22) Filed: Mar. 9, 2012

(65) Prior Publication Data
US 2012/0288412 A1 Nov. 15, 2012

Related U.S. Application Data

(63) Continuation-in-part of application No. 12/321,261, filed on Jan. 16, 2009, now abandoned, which is a
(Continued)

(51) Int. Cl.
*B01J 8/00* (2006.01)
*C10G 45/00* (2006.01)
(Continued)

(52) U.S. Cl.
CPC ............... *C10G 65/04* (2013.01); *C01B 3/38* (2013.01); *C01B 3/48* (2013.01); *C10G 3/42* (2013.01);
(Continued)

(58) Field of Classification Search
USPC .... 422/198, 200–201; 208/49, 57, 209, 211; 585/258, 700; 423/230–231, 244.01,
(Continued)

(56) References Cited

U.S. PATENT DOCUMENTS

| 4,371,728 A | 2/1983 | Farha, Jr. et al. |
| 4,976,747 A | 12/1990 | Szydlowski et al. |

(Continued)

OTHER PUBLICATIONS

Weisser, O. et al. (1973). Sulphide Catalysts Their Properties and Applications, Pergamon Press, 506 pgs (Office action cites pp. 118 & 120).*

(Continued)

*Primary Examiner* — Brian McCaig
(74) *Attorney, Agent, or Firm* — Carlson, Gaskey & Olds, P.C.

(57) ABSTRACT

A reformer system (11) having a hydrodesulfurizer (12) provides desulfurized natural gas feedstock to a catalytic steam reformer (16), the outflow of which is treated by a water gas shift reactor (20) and optionally a preferential CO oxidizer (58) to provide reformate gas (28, 28a) having high hydrogen and moderate carbon dioxide content. To avoid damage to the hydrodesulfurizer from overheating, any deleterious hydrogen reactants, such as the oxygen in peak shave gas or olefins, in the non-desulfurized natural gas feedstock (35) are reacted (38) with hydrogen (28, 28a; 71) to convert them to alkanes (e.g., ethylene and propylene to ethane and propane) and to convert oxygen to water in a catalytic reactor (38) having no sulfide sorbent, and cooled (46), below a temperature which would damage the reactor, by evaporative cooling with pressurized hot water (42). Hydrogen for the desulfurizer and the hydrogen reactions may be provided as recycle reformate (28, 28a) or from a mini-CPO (67), or from other sources.

2 Claims, 3 Drawing Sheets

Related U.S. Application Data continuation-in-part of application No. PCT/US2006/030658, filed on Aug. 3, 2006.

(51) Int. Cl.

| | | |
|---|---|---|
| *C10G 65/04* | (2006.01) | |
| *C10G 45/02* | (2006.01) | |
| *C10L 3/10* | (2006.01) | |
| *C10G 3/00* | (2006.01) | |
| *C01B 3/38* | (2006.01) | |
| *C01B 3/48* | (2006.01) | |

(52) U.S. Cl.
CPC ............... *C10G 3/50* (2013.01); *C10G 45/00* (2013.01); *C10G 45/02* (2013.01); *C10L 3/101* (2013.01); *C10L 3/103* (2013.01); *C01B 2203/0233* (2013.01); *C01B 2203/0283* (2013.01); *C01B 2203/044* (2013.01); *C01B 2203/065* (2013.01); *C01B 2203/1058* (2013.01); *C01B 2203/1064* (2013.01); *C01B 2203/127* (2013.01); *C01B 2203/1276* (2013.01); *C10G 2300/1025* (2013.01); *C10G 2300/202* (2013.01)

(58) Field of Classification Search
USPC ............... 423/244.02, 244.09, 244.1, 244.11
See application file for complete search history.

(56) References Cited

U.S. PATENT DOCUMENTS

| | | | |
|---|---|---|---|
| 6,210,821 | B1 | 4/2001 | Lesieur et al. |
| 2002/0115732 | A1* | 8/2002 | Moore et al. ................. 518/705 |
| 2003/0230517 | A1* | 12/2003 | Groten ......................... 208/209 |
| 2005/0177014 | A1* | 8/2005 | Eilos et al. ................... 585/265 |
| 2008/0244962 | A1* | 10/2008 | Abhari et al. ................. 44/308 |

OTHER PUBLICATIONS

Gates, B.C. et al. (1979). Chemistry of Catalytic Processes, McGraw-Hill, 464 pgs (Office action references p. 260).*

* cited by examiner

US 9,745,526 B2

FUEL PROCESSING OF FEEDSTOCKS HAVING COMPONENTS HARMFUL TO HYDRODESULFURIZATION

This application is a continuation-in-part of U.S. patent application Ser. No. 12/321,261, filed Jan. 16, 2009, now abandoned, in turn a continuation-in-part of application PCT/US2006/030658, filed Aug. 3, 2006, now expired.

TECHNICAL FIELD

This modality relates to processing of conventional pipeline natural gas feedstock which contains either peak shave gas or high concentrations of olefins, such as propylene and ethylene, to convert the oxygen in peak shave gas to water and to convert olefins to alkanes, such as ethane and propane, prior to desulfurization in a system which reforms the feedstock and processes it to create reformate gas with a high hydrogen content.

BACKGROUND ART

Reformation of conventional natural gas feedstocks create reformate gas having a high concentration of hydrogen, usually with further processing to lower the concentrations of CO, providing hydrogen fuel for fuel cells (and other purposes). The processing typically begins with desulfurization in a catalytic hydrodesulfurizer (HDS). Pipeline natural gas, at times, is injected with concentrations as high as 15 volume percent of olefins ($C_nH_{2n}$) such as ethylene and/or propylene, such as, for instance, to maintain the heating value of the gas.

Pipeline natural gas is often supplemented with peak shave gas, which typically contains propane diluted with air which contains oxygen; sometimes the peak shave gas includes propylene. The olefins and the oxygen react with hydrogen in the HDS, raising the temperature of the catalyst bed to levels which reduce HDS performance and may cause failure of the HDS. In order to protect against such high temperature excursions, a system controller is typically programmed to respond to excess temperature by reducing the power output of the fuel cell or other reformate consuming system (sometimes referred to as "foldback"), and if the problem is not thereby corrected, by shutting down the fuel cell or other reformate consuming system.

Olefins react over the hydrodesulfurizer catalyst in the presence of hydrogen to form alkanes ($C_nH_{2n+2}$), generating heat. For example, ethylene (reaction 1) and propylene (reaction 2) react to form ethane and propane:

$$C_2H_4 + H_2 \rightarrow C_2H_6 + \text{heat} \quad (1)$$

$$C_3H_6 + H_2 \rightarrow C_3H_8 + \text{heat} \quad (2)$$

The oxygen and any propylene in the peak shave gas will also react over the hydrodesulfurizer catalyst in the presence of hydrogen to form water and propane, generating heat. Oxygen and hydrogen (reaction 3) forms water, and propylene reacts with hydrogen (reaction 2) to form propane.

$$H_2 + \tfrac{1}{2}O_2 \rightarrow H_2O + \text{heat} \quad (3)$$

These reactions are highly exothermic, for instance, generating temperature rises of up to 28 C (50 F) per percent of olefin or oxygen concentration in the feedstock, which may be as high as 15%.

SUMMARY

This modality may yield a nearly olefin-free and oxygen-free natural gas feedstock, reduce shut downs and foldbacks in apparatus employing reformate hydrogen generated from natural gas feedstock, reform natural gas to provide reformate more reliably, deal with olefins and oxygen in natural gas feedstock in a simple fashion, and improve reliability of desulfurization of natural gas feedstock.

The modality herein is also predicated on recognition of the fact that feedstock without shave gas or olefins can pass through a hydrogenator on a continual basis, for long periods of time, with no effect on the desulfurizer and with only minimal effect on the hydrogenator. These factors provide the capability of dealing with hydrogenation separately from the reaction to remove sulfur. The separation of hydrogenation from desulfurization supports reactor designs that accommodate the fact that hydrogenation, of olefins or oxygen in peak shave gas added to natural gas, involves a reaction many orders of magnitude larger than the reaction to desulfurize a corresponding volume of natural gas. This is due to the fact that the amount of sulfur to be removed is on the order of parts per million, whereas the oxygen or olefins are up to 15% (volume) of the natural gas feedstock.

This modality is predicated on realization that excessively exothermic reactions may not only be distanced from delicate, vulnerable catalysts, but may also be carried out in the presence of heat removal so as to avoid excessive temperature spikes that can harm a catalyst.

The present modality maintains the catalytic bed in a catalytic, natural gas hydrodesulfurizer (HDS) below a maximum temperature limit by reacting any deleterious hydrogen reactants in the feedstock, such as olefins or oxygen, with hydrogen, to convert olefins (such as ethylene or propylene) to corresponding alkanes (such as ethane or propane) and to convert oxygen to water, before the stream of feedstock, now in a non-deleterious form, reaches the hydrodesulfurizer. The advantage of this modality is that the deleterious reactants such as olefins or oxygen are no longer available to react in the hydrodesulfurizer, and thus do not cause a power plant shutdown or foldback.

This modality further includes reacting the natural gas feedstock in a cooled catalytic reactor: the cooling of the reaction of olefins or oxygen with hydrogen limits the temperature of the hydrogenation reaction processes, thereby avoiding damage to a vessel or catalyst. It also ensures conversion of a high percentage of the olefins or oxygen in the feedstock to alkanes or water when operating at rated power.

In this modality, the coolant may be pressurized hot water, which may be on the order of between about 150 C (300 F) and about 210 C (375 F), or higher. The exothermic hydrogenation process is balanced, in that the reaction of more deleterious hydrogen reactants will simply boil more of the coolant water (that is convert more water to steam), which is endothermic and provides a gas exit temperature from the hydrogenator in the range appropriate for the inlet temperature of the hydrodesulfurizer or a pre-HDS heat exchanger, if used.

When deemed necessary or desirable, a post reaction cooler, which may comprise an air cooled radiator or a liquid coolant heat exchanger, may cool the processed feedstock to an appropriate temperature, such as on the order of 90 C (190 F), prior to entering the hydrodesulfurizer.

Having removed the deleterious hydrogen reactants from the feedstock, controlling the HDS inlet temperature assures that even a maximal sulfur reaction will not affect the HDS temperature significantly.

This modality may be practiced (a) with recycled reformate obtained at any point downstream of either a reformer, a shift converter or a preferential oxidizer, fed by the hydrodesulfurizer, or (b) with hydrogen-containing gas from another source, such as a mini catalytic partial oxidizer.

This modality may be implemented as original equipment or conveniently as a retrofit, since it requires only a small adaptation with respect to providing a reactor and hydrogen for converting the deleterious hydrogen reactants. The modality is very simple, allowing the components that perform the hydrogen reactions to remain within the feedstock stream without consequence, even when no deleterious hydrogen reactants are in the feedstock.

Other variations will become apparent in the light of the following detailed description of exemplary embodiments, as illustrated in the accompanying drawings.

MODE(S) OF IMPLEMENTATION

Figure 1:
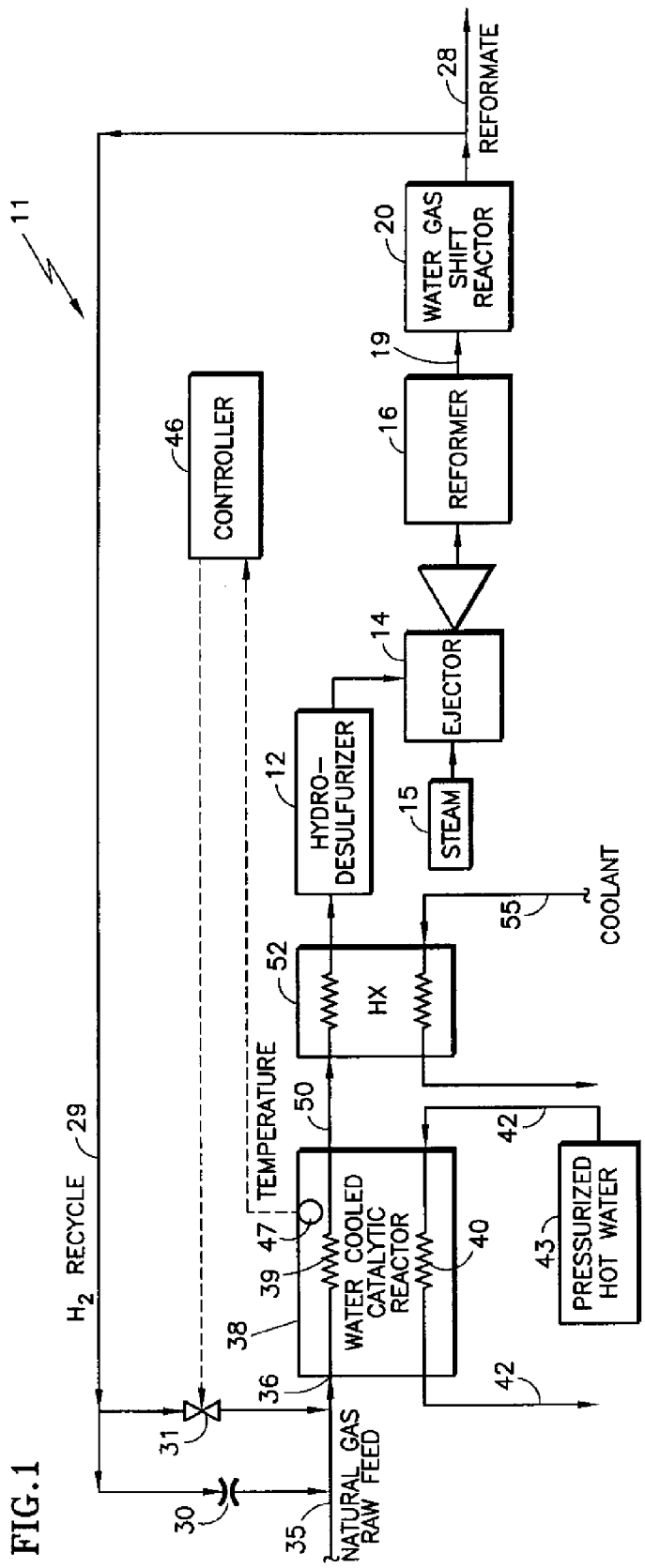
FIG. 1 is a simplified, stylized, block diagram of a natural gas desulfurization and reforming system employing a first embodiment.

Referring to FIG. 1, a natural gas desulfurization and reformation system 11 includes a hydrodesulfurizer 12, which contains a conventional, commercially available catalyst, such as platinum and sorption material such as zinc oxide. The desulfurized feed is mixed in an ejector 14 with steam from any suitable source 15 and enters an inle, of a reformer 16, which may be a catalytic partial oxidizer, a non-catalytic partial oxidizer, or an autothermal device, but in this embodiment is a catalytic steam reformer, typically utilizing a noble metal, such as Platinum, Palladium, Rhodium, Ruthenium or alloys thereof, or a Nickel catalyst.

From the reformer 16, a process gas containing a high percentage of hydrogen, as well as some carbon monoxide and carbon dioxide, is fed over a conduit 19 to a conventional water gas shift reactor 20 that converts a substantial amount of CO and water into $CO_2$ and hydrogen.

The result is reformate gas in a conduit 28 which contains a high percentage of hydrogen, some $CO_2$ and other gases, possibly including unreformed hydrocarbons. The hydrogen-containing reformate gas is fed by a conduit 29 through an orifice 30 to provide an adequate flow of hydrogen for desulfurization, when reaction of deleterious hydrogen reactants is not required, and to provide additional hydrogen through a valve 31 when reaction of deleterious hydrogen reactants, such as olefins or oxygen, is required.

The hydrogen and natural gas raw feedstock in a conduit 35 are provided to an inlet 36 of a water cooled catalytic reactor 38, which may comprise a dual coil heat exchanger having catalysts disposed on the surfaces of a primary coil 39, with high pressure hot water in lines 42 from a source 43 circulating through a secondary coil 40. In accordance with the invention, the catalytic reactor 38 can be considered a passive device in terms of controlling operating temperature. Coolant flow from the source 43 is set to control the reactor temperature within an acceptable range given any possible deleterious hydrogen reactant content in the natural gas raw feedstock. A controller 46 adjusts $H_2$ flow through the valve 31 in response to variations in reactor temperature, within the aforementioned range of temperature, as indicated by a temperature sensor 47. As the reactor temperature increases, the $H_2$ flow is increased according to a predetermined schedule, to provide enough $H_2$ to the catalytic reactor to assure conversion of all the olefins or oxygen, while minimizing the $H_2$ flow when olefin or oxygen content is low or zero.

The temperature of the pressurized hot water from the source may be greater than 180 C (325 F), but is in the liquid phase because of being at a pressure on the order of 1030 kPa (150 psi). When the reaction of a deleterious hydrogen reactant with hydrogen raises the temperature above about 180 C (356 F), the hot water will boil, producing steam, which is endothermic and keeps the temperature from rising above the vaporization temperature at the pressure of the hot water. This also provides passive control on the temperature within the cooled catalytic reactor 38, so that the catalyst is not harmed and there is no danger to the structural integrity of the vessel.

Maintaining catalyst temperature is a critical function of the water cooled reactor design. Virgin reactor catalyst and in-service catalysts that have been subjected only to short term exposure to a feedstock bearing no deleterious hydrogen reactants but containing catalyst poisons, such as sulfur, will initiate the hydrogenation reaction upon exposure to feedstock bearing olefins or peak shave gas at temperatures less than room temperature (21 C, 70 F). However, some reactor catalysts containing noble metals, when subjected to long term exposure to feedstock bearing no deleterious hydrogen reactants but containing poisons, require an elevated temperature to initiate the hydrogen reaction upon re-introduction of feedstock containing deleterious hydrogen reactants and poisons. This minimum temperature is defined herein as the light off temperature.

The light-off temperature is functionally dependent on the inlet gas conditions and the inherent physical/chemical properties of the catalyst. The cooled reactor 38 is designed to maintain the catalyst above the light off temperature required by the selected catalyst to initiate the hydrogen reaction after long term exposure to feedstocks bearing no olefins or peak shave gas but containing poisons, such as sulfur, which may inhibit the reaction at room temperature. The light off temperature should be about 100 C (212 F).

A second critical function of the cooled reactor design is to limit the maximum temperature within the catalyst bed to prevent catalyst damage or deactivation and to limit the thermodynamic equilibrium olefin slip to acceptable levels. The cooled reactor design for the exemplary embodiment maintains the catalyst temperature between 100 C (212 F) and 310 C (590) by using cooling water at an inlet temperature between 150 C (302 F) and 210 C (410 F).

Another critical design feature of the cooled reactor is that it reduces the deleterious hydrogen reactant content of the feedstock to a level which is consistent with the maximum limits for the down stream equipment. The cooling capacity of the cooled reactor 38 must be sized to absorb the heat release associated with at least this minimum deleterious hydrogen reactant conversion. Typically, the maximum limit for the down stream equipment is set by both the inlet feedstock gas temperature to the HDS, and the maximum HDS catalyst bed temperature limit. Typically, the minimum required deleterious hydrogen reactant conversion is 80%, and the cooled reactor is sized to convert 100% of the deleterious hydrogen reactant and to absorb all of the heat release associated with that conversion level, with the coolant temperature proper at all expected operating conditions.

The outflow from the cooled reactor 38 in a conduit 50 may exceed the desired inlet temperature of downstream equipment. In the disclosed embodiment, the hydrodesulfurizer 12 is one which has been designed to be connected directly to the feedstock source (the natural gas pipeline), without any preprocessing. If therefore has a heater section which precedes the catalyst/absorber bed, to raise the feedstock from the nominal temperature of the natural gas source, about 21 C (70 F), to between about 260 C (500 F) and about 340 C (650 F). The heater section inlet temperature is therefore cooled to be about the nominal temperature of the natural gas source.

In the exemplary embodiment, the exit temperature of the reactor 38 may be in excess of 215 C (419 F), which exceeds the desired inlet temperature of the hydrodesulfurizer 12. A heat exchanger 52 is employed in the disclosed embodiment of the design to reduce the temperature of the deleterious hydrogen reactant-depleted feedstock to about 100 C (212 F). The heat exchanger may comprise an air cooled radiator in most cases, but if necessary, can comprise a heat exchanger cooled by a liquid coolant in a conduit 55. In other embodiments, a hydrodesulfurizer without a heater section, or with a less robust heater section, may avoid the need for the heat exchanger 52. These and other details are selected as may be suitable for any given implementation of the present modality.

The hydrogenator has no sulfide absorbent and therefor does not remove any sulfur from the gas stream, even though a small amount of sulfur may be converted to hydrogen sulfide in the hydrogenator.

A number of other variations may be made in the details of implementation, when incorporating the modality into a system. For instance, instead of the orifice 30, conduit sizing may be used to provide a reduced flow of $H_2$ when reaction of deleterious hydrogen reactants is not required. In place of the orifice 30, another valve, controllable by the controller 46, may be employed. Or, both functions may be performed by appropriate control of a single valve 31, without the orifice 30.

Figure 2:
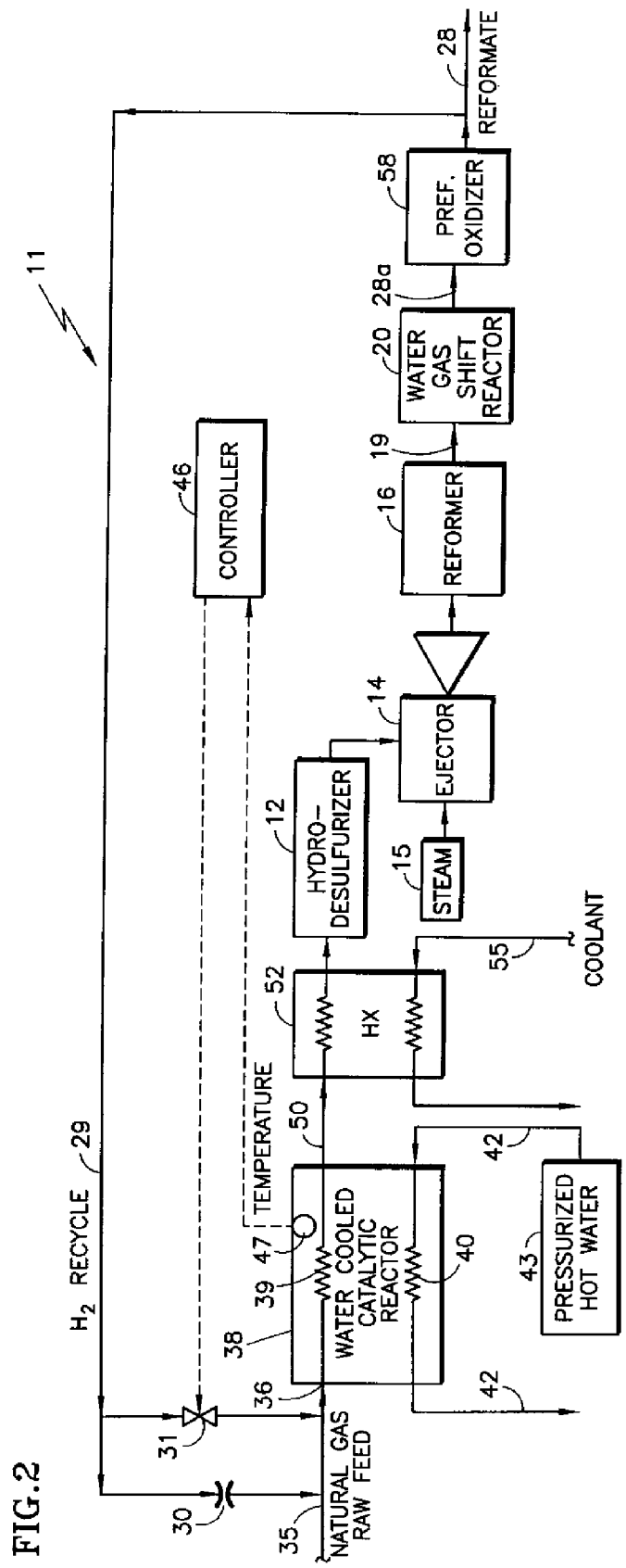
FIG. 2 is a simplified, stylized, block diagram of a natural gas desulfurization and reforming system employing a second embodiment.

As shown in FIG. 2, in some applications, such as when the reformate will fuel a proton exchange membrane fuel cell, the reformed gas is fed in a conduit 28a to a preferential carbon monoxide oxidizer 58 where additional CO is converted to $CO_2$. The reformate with lower CO concentrations is available for utilization in the conduit 28 as well as being applied to the orifice 30 and valve 31 by the conduit 29.

Figure 3:
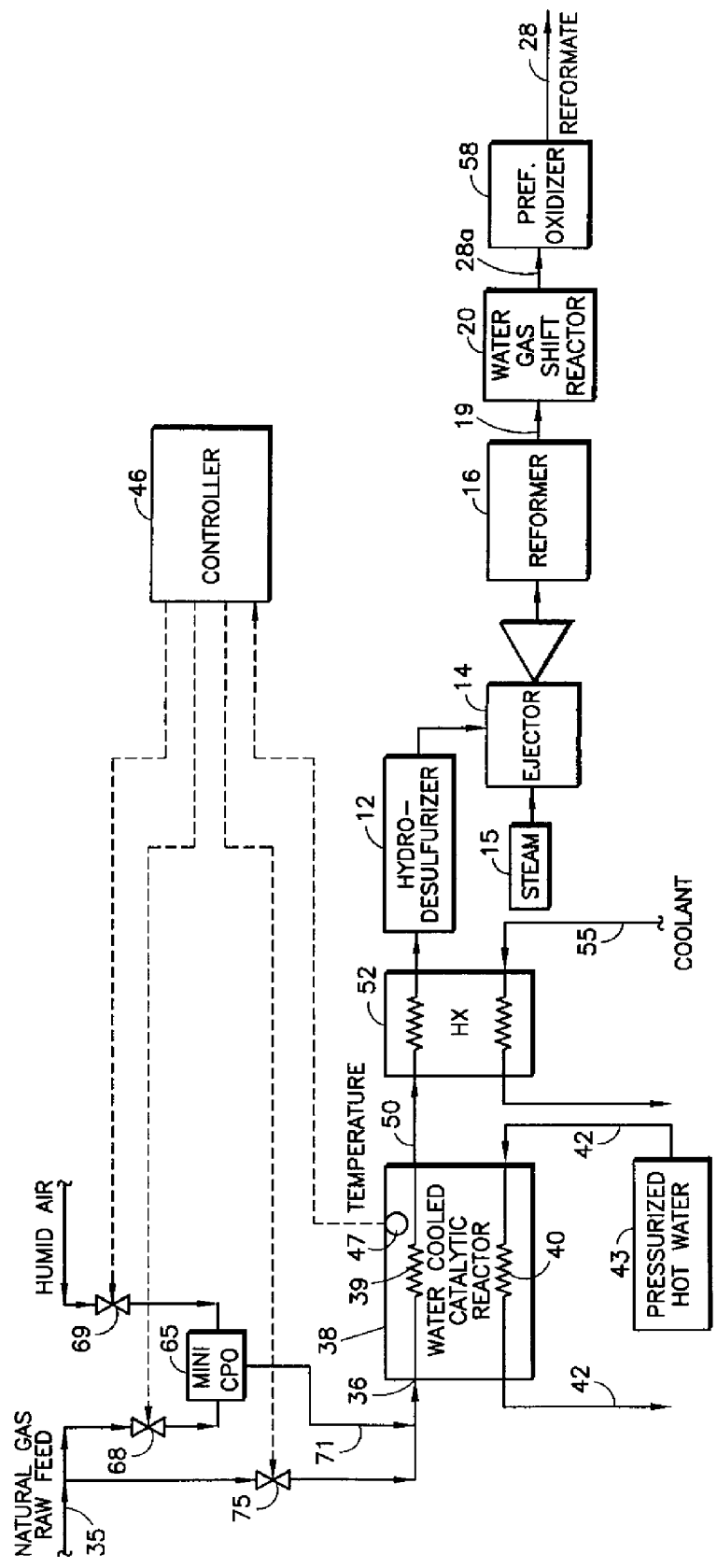
FIG. 3 is a simplified, stylized, block diagram of a natural gas desulfurization and reforming system employing a third embodiment.

Another embodiment of the invention, illustrated in FIG. 3, does not use recycle hydrogen either for desulfurization or for conversion of deleterious hydrogen reactants. Instead, a mini-catalytic partial oxidizer 65 (mini CPO) receives non-desulfurized natural gas through a valve 68 and humidified air through a valve 69 to produce sufficient hydrogen in a conduit 71 for reaction with any deleterious hydrogen reactants and for hydrodesulfurization of the feedstock. A valve 75 may control the flow of feedstock from the conduit 35 to the inlet 36 of the reactor 38. Hydrogen may be provided to the processes herein from other sources, if desired. Since the mini CPO fuel and air are controlled by the controller 46 via valves 68 and 69, orifice 30 and valve 31 are not needed in this embodiment.

The term "non-deleterious" means having the deleterious hydrogen reactants reduced sufficiently so as to not cause excessive temperatures in the hydrodesulfurizer as a result of reactions therewith, which typically requires conversion of at least about 80% of the deleterious hydrogen reactants to alkanes or water, for instance.

The natural gas feedstock in conduit 35 is allowed to flow through the reactor 38 at all times (even when not needed to convert deleterious hydrogen reactants) for mechanical and control simplicity, and to support quicker response to excessive temperatures. The amount of hydrogen is varied for beneficial removal of deleterious hydrogen reactants in accordance with a pre-determined operating temperature range within the catalyst bed of the reactor 38. In this embodiment, the operating temperature range of the reactor 38 is set at 149 C (300 F) to 177 C (350 F).

Since changes and variations of the disclosed embodiments may be made without departing from the concept's intent, it is not intended to limit the disclosure other than as required by the appended claims.

The invention claimed is:

1. An apparatus, comprising:
   a hydrogenator devoid of sulfide absorbent, connected to a source of hydrogen-containing gas and to a source of hydrocarbon feedstock and configured to catalytically react a substantial portion of any olefins or oxygen in the feedstock to alkanes or water, respectively, wherein the hydrogenator comprises a dual coil heat exchanger having catalyst disposed on surfaces of a primary coil and having a secondary coil with flowing water at pressure to evaporate within a predetermined temperature range; and
   a hydrodesulfurizer having a catalyst/absorber bed, which may have or may not have a feedstock heater upstream of the catalyst/absorber bed, the hydrodesulfurizer inlet connected to the outlet of the hydrogenator, either through a heat exchanger or directly, to continuously receive feedstock from the source of feedstock, through the hydrogenator, whether or not the feedstock entering the hydrogenator contains olefins or oxygen.

2. The apparatus according to claim 1, comprising:
   a temperature sensor for sensing the temperature within the hydrogenator;
   the source of hydrogen containing gas includes controllable valving; and
   a controller responsive to the temperature sensor to cause the controllable valving to provide, within the predetermined range of temperatures, only sufficient hydrogen to convert a predetermined amount of sulfur, and to cause the controllable valving to provide, at temperatures above the predetermined temperature range, additional hydrogen in relation to the temperature.

* * * * *